(12) United States Patent
Wang et al.

(10) Patent No.: US 11,816,360 B2
(45) Date of Patent: Nov. 14, 2023

(54) METHOD AND APPARATUS FOR PERFORMING DATA ACCESS PERFORMANCE SHAPING OF MEMORY DEVICE

(71) Applicant: Silicon Motion, Inc., Hsinchu County (TW)

(72) Inventors: Kaihong Wang, Colorado Springs, CO (US); Cheng Yi, Vancouver (CA)

(73) Assignee: Silicon Motion, Inc., Hsinchu County (TW)

( * ) Notice: Subject to any disclaimer, the term of this patent is extended or adjusted under 35 U.S.C. 154(b) by 84 days.

(21) Appl. No.: 17/706,645

(22) Filed: Mar. 29, 2022

(65) Prior Publication Data
US 2023/0315337 A1  Oct. 5, 2023

(51) Int. Cl.
  *G06F 3/06*  (2006.01)
(52) U.S. Cl.
  CPC ............ *G06F 3/0659* (2013.01); *G06F 3/064* (2013.01); *G06F 3/0604* (2013.01); *G06F 3/0613* (2013.01); *G06F 3/0631* (2013.01); *G06F 3/0653* (2013.01); *G06F 3/0679* (2013.01)
(58) Field of Classification Search
  None
  See application file for complete search history.

(56) References Cited

U.S. PATENT DOCUMENTS

| | | | | |
|---|---|---|---|---|
| 2004/0054857 | A1* | 3/2004 | Nowshadi | H04L 47/50 711/151 |
| 2016/0299693 | A1* | 10/2016 | Sakdeo | G06F 11/3409 |
| 2021/0341988 | A1* | 11/2021 | Chung | G06F 3/0659 |

FOREIGN PATENT DOCUMENTS

WO   WO-03025709 A2 *  3/2003  ............ G06F 15/00

* cited by examiner

*Primary Examiner* — Charles Rones
*Assistant Examiner* — Ryan Dare
(74) *Attorney, Agent, or Firm* — Winston Hsu (57) ABSTRACT

A method for performing data access performance shaping of a memory device and associated apparatus are provided. The method may include: receiving a plurality of host commands from a host device, for performing data access on the NV memory according to the plurality of host commands; and monitoring the plurality of host commands to control respective performance metrics of a plurality of access control groups of the memory device with a dual-state leaky bucket (LB) model, wherein regarding any access control group, for example: determining at least one first performance metric according to at least one first command to be a first LB fill level of a dual-state LB; in response to the first LB fill level being below a state threshold, determining the dual-state LB to be in a first predetermined state, and configuring the dual-state LB to have a first predetermined drain rate, for dynamically adjusting performance quota.

12 Claims, 9 Drawing Sheets

METHOD AND APPARATUS FOR PERFORMING DATA ACCESS PERFORMANCE SHAPING OF MEMORY DEVICE

BACKGROUND OF THE INVENTION

1. Field of the Invention

The present invention is related to memory control, and more particularly, to a method and apparatus for performing data access performance shaping of a memory device.

2. Description of the Prior Art

A memory device may comprise Flash memory for storing data, and the management of accessing the Flash memory is complicated. For example, the memory device may be a memory card, a solid state drive (SSD), or an embedded storage device such as that conforming to Universal Flash Storage (UFS) specification. When a manufacture tries to implement some features of the memory device according to existing specification, some problems may occur. More particularly, the memory device may spend too much time on performing some internal operations of the memory device in response to host-side requests, causing the overall performance to be reduced. The related art tries to correct the problem, but further problems such as some side effects may be introduced. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing data access performance shaping of a memory device, in order to solve the above-mentioned problems.

At least one embodiment of the present invention provides a method for performing data access performance shaping of a memory device, where the method can be applied to a memory controller of the memory device. The memory device may comprise the memory controller and a non-volatile (NV) memory, and the NV memory may comprise at least one NV memory element (e.g., one or more NV memory elements). The method may comprise: receiving a plurality of host commands from a host device, for performing data access on the NV memory according to the plurality of host commands; and monitoring the plurality of host commands to control respective performance metrics of a plurality of access control groups of the memory device with a dual-state leaky bucket (LB) model. Regarding any access control group among the plurality of access control groups, controlling the respective performance metrics of the plurality of access control groups with the dual-state LB model may comprise: determining at least one first performance metric of the any access control group according to at least one first command among the plurality of host commands to be a first LB fill level of a dual-state LB in the dual-state LB model, wherein the at least one first command carries first information related to data access performance of the any access control group; in response to the first LB fill level being below a state threshold, determining the dual-state LB to be in a first predetermined state among multiple predetermined states of the dual-state LB; and in response to the dual-state LB being in the first predetermined state, configuring the dual-state LB to have a first predetermined drain rate corresponding to the first predetermined state, for dynamically adjusting a performance quota of the any access control group, wherein the first predetermined drain rate is selected from multiple predetermined drain rate respectively corresponding to the multiple predetermined states of the dual-state LB.

In addition to the above method, the present invention also provides a memory controller of a memory device, where the memory device comprises the memory controller and a NV memory. The NV memory may comprise at least one NV memory element (e.g., one or more NV memory elements). In addition, the memory controller comprises a processing circuit that is arranged to control the memory controller according to a plurality of host commands from a host device, to allow the host device to access the NV memory through the memory controller, wherein the processing circuit is arranged to perform data access control of the memory device with aid of a predetermined command. The memory controller further comprises a transmission interface circuit, and the transmission interface circuit is arranged to perform communications with the host device. The memory controller further comprises a data access performance shaping engine circuit, and the data access performance shaping engine circuit is arranged to perform data access performance shaping. For example, the memory controller receives the plurality of host commands from the host device through the transmission interface circuit of the memory controller, for performing data access on the NV memory according to the plurality of host commands; and the memory controller monitors the plurality of host commands to control respective performance metrics of a plurality of access control groups of the memory device with a dual-state leaky bucket (LB) model. Regarding any access control group among the plurality of access control groups, controlling the respective performance metrics of the plurality of access control groups with the dual-state LB model may comprise: utilizing the data access performance shaping engine circuit to determine at least one first performance metric of the any access control group according to at least one first command among the plurality of host commands to be a first LB fill level of a dual-state LB in the dual-state LB model, wherein the at least one first command carries first information related to data access performance of the any access control group; in response to the first LB fill level being below a state threshold, utilizing the data access performance shaping engine circuit to determine the dual-state LB to be in a first predetermined state among multiple predetermined states of the dual-state LB; and in response to the dual-state LB being in the first predetermined state, utilizing the data access performance shaping engine circuit to configure the dual-state LB to have a first predetermined drain rate corresponding to the first predetermined state, for dynamically adjusting a performance quota of the any access control group, wherein the first predetermined drain rate is selected from multiple predetermined drain rate respectively corresponding to the multiple predetermined states of the dual-state LB.

In addition to the method mentioned above, the present invention also provides a data access performance shaping engine circuit that operates according to the method, wherein the data access performance shaping engine circuit can be embedded within the memory controller.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

The present invention method and apparatus can guarantee that the memory device can operate properly in various situations, and more particularly, prevent spending too much time on performing some internal operations of the memory device in response to host-side requests. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Embodiments of the present invention provide a method and apparatus for performing data access performance shaping of a memory device. The memory device that operates according to the method can store data for a host device, and more particularly, can perform data access on at least one storage component therein (e.g., write the data into the at least one storage component and/or read the data from the at least one storage component) and perform data access performance shaping with a dedicated hardware component (e.g., a hardware engine) embedded therein in a parallel manner. As a result, the memory device that operates according to the method can dynamically shape the host input/output (TO) traffics to a plurality of media quality of service (QoS) control groups (e.g., NVM sets, namespaces, and NVMe controllers) of the memory device. In addition, the memory device that operates according to the method can configure respective parameters of multiple sub-circuits of the dedicated hardware component, and shape the host IO traffics to the plurality of media QoS control groups according to these parameters, respectively, and more particularly, can perform multi-level (e.g., two-level) performance shaping control to meet the per QoS control group performance need and also the device level performance need.

Figure 1:
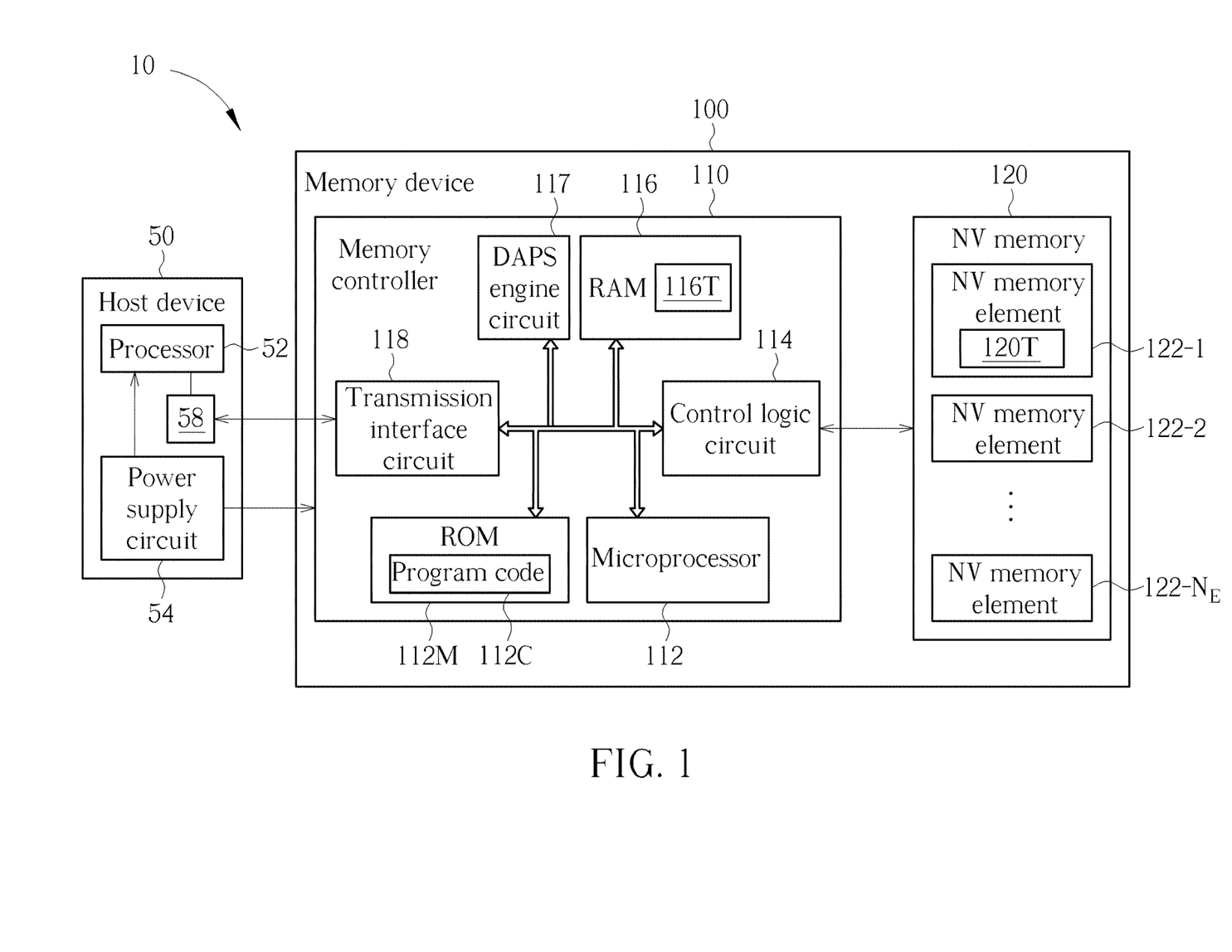
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100, which can be taken as examples of the host device and the memory device mentioned above. The host device 50 may comprise at least one processor (e.g., one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). According to this embodiment, the memory device 100 may comprise a controller such as a memory controller 110, and may further comprise a non-volatile (NV) memory 120, where the memory controller 110 is arranged to access the NV memory 120, and the NV memory 120 is arranged to store information. The NV memory 120 can be taken as an example of the at least one storage component mentioned above. The NV memory 120 may comprise at least one NV memory element (e.g., one or more NV memory elements), such as a plurality of NV memory elements 122-1, 122-2, ..., and 122-$N_E$, where "$N_E$" may represent a positive integer that is greater than one. For example, the NV memory 120 may be a flash memory, and the plurality of NV memory elements 122-1, 122-2, ..., and 122-$N_E$ may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a random access memory (RAM) 116 (which may be implemented by way of static random access memory (SRAM), for example), a data access performance shaping (DAPS) engine circuit 117 and a transmission interface circuit 118, where at least one portion (e.g., a portion or all) of the above components may be coupled to one another via a bus. The RAM 116 may be arranged to provide the memory controller 110 with internal storage space (for example, may temporarily store information), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise an error correction code (ECC) circuit (not shown in FIG. 1), which may perform ECC encoding and ECC decoding, to protect data, and/or perform error correction. The DAPS engine circuit 117 can be taken as an example of the dedicated hardware component (e.g., the hardware engine) mentioned above. The DAPS engine circuit 117 can be arranged to perform data access performance shaping for the memory device 100 (e.g., the memory controller 110). The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, Non-Volatile Memory Express (NVMe) specification, embedded Multi Media Card (eMMC) specification, and Universal Flash Storage (UFS) specification), and may perform communications with the host device 50 (e.g., the transmission interface circuit 58) according to the one or more communications specifications for the memory device 100. Similarly, the transmission interface circuit 58 may conform to the one or more communications specifications, and may perform communications with the memory device 100 (e.g., the transmission interface circuit 118) according to the one or more communications specifications for the host device 50.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programming upon the memory units or data pages of corresponding physical addresses within the NV memory 120, where the physical addresses can be associated with the logical addresses. For example, the memory controller 110 may generate or update at least one logical-to-physical (L2P) address mapping table to manage the relationship between the physical addresses and the logical addresses, where the NV memory 120 may store a global L2P address mapping table 120T, for the memory controller 110 to control the memory device 100 to access data in the NV memory 120, but the present invention is not limited thereto.

For better comprehension, the global L2P address mapping table 120T may be located in a predetermined region within the NV memory element 122-1, such as a system region, but the present invention is not limited thereto. For example, the global L2P address mapping table 120T may be divided into a plurality of local L2P address mapping tables, and the local L2P address mapping tables may be stored in one or more of the NV memory elements 122-1, 122-2, ..., and 122-$N_E$, and more particularly, may be stored in the NV memory elements 122-1, 122-2, ..., and 122-$N_E$, respectively. When there is a needed, the memory controller 110 may load at least one portion (e.g., a portion or all) of the global L2P address mapping table 120T into the RAM 116 or other memories. For example, the memory controller 110 may load a local L2P address mapping table among the plurality of local L2P address mapping tables into the RAM 116 to be a temporary L2P address mapping table 116T, for accessing data in the NV memory 120 according to the local L2P address mapping table which is stored as the temporary L2P address mapping table 116T, but the present invention is not limited thereto.

In addition, the aforementioned at least one NV memory element (e.g., the one or more NV memory elements such as {122-1, 122-2, ..., 122-$N_E$}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-$n$ (where "n" may represent any integer in the interval [1, $N_E$]) among the NV memory elements 122-1, 122-2, ..., and 122-$N_E$ may comprise multiple blocks, and a block within the multiple blocks may comprise and record a specific number of pages, where the memory controller 110 may access a certain page of a certain block within the multiple blocks according to a block address and a page address.

Figure 2:
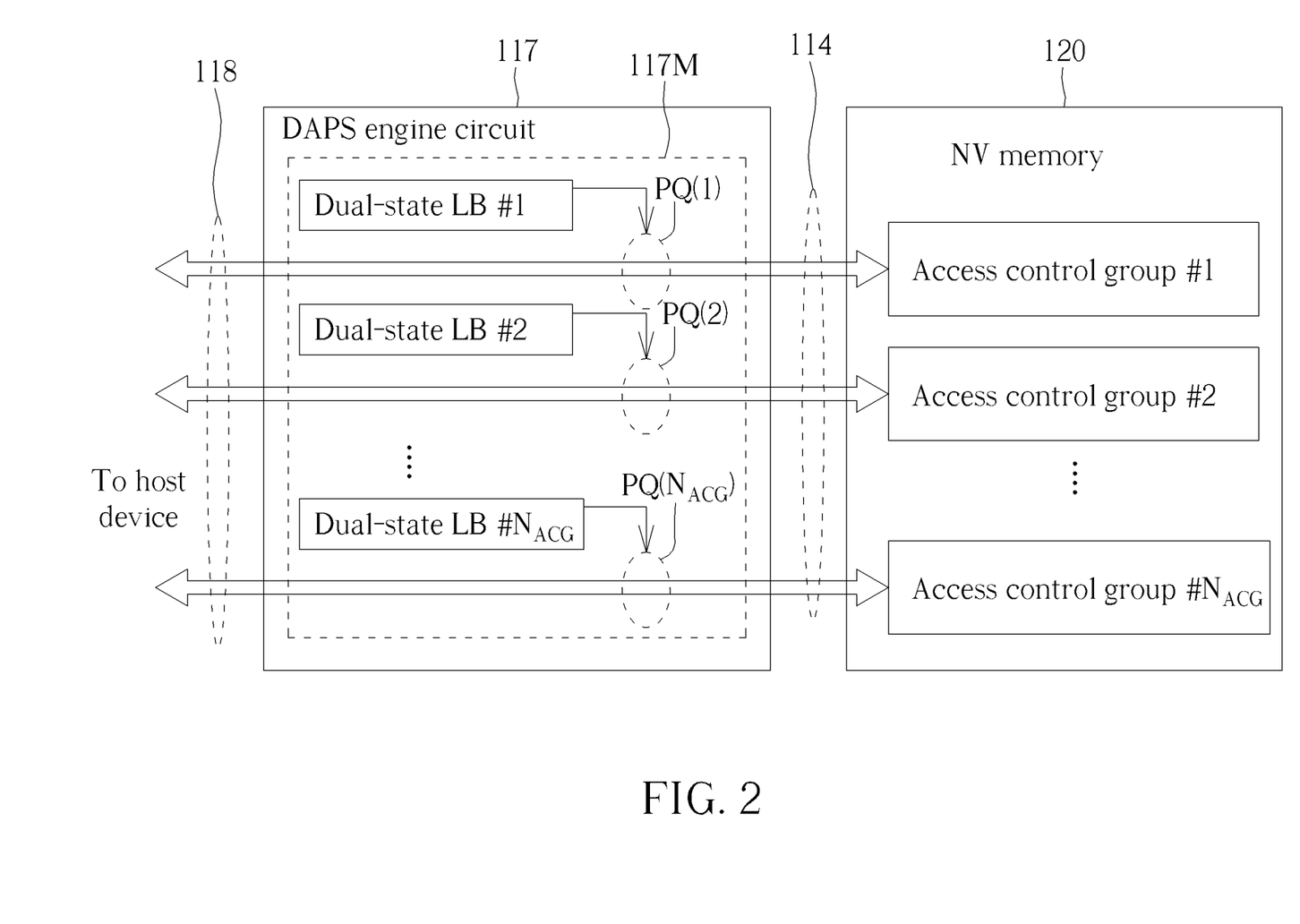
FIG. 2 illustrates a programmable performance shaping control scheme of a method for performing data access performance shaping of a memory device according to an embodiment of the present invention.

FIG. 2 illustrates a programmable performance shaping control scheme of the method for performing data access performance shaping of the memory device (e.g., the memory device 100) according to an embodiment of the present invention. The DAPS engine circuit 117 embedded in the memory controller 110 shown in FIG. 1 can be programmable by the microprocessor 112 in order to set up a plurality of parameters of a dual-state leaky bucket (LB) model 117M for shaping the input/output (IO) performance of the memory device 100, such as the respective IO performance of a plurality of access control groups of the memory device 100, and therefore can be regarded as a programmable performance shaping engine. The memory controller 110 that operates according to the method can manage the respective QoS of the plurality of access control groups, where the plurality of access control groups may represent a plurality of QoS control groups of the memory device 100, such as the plurality of media QoS control groups mentioned above.

The dual-state LB model 117M may comprise a plurality of dual-state LBs such as $N_{ACG}$ dual-state LBs #1, #2, ... and #$N_{ACG}$, and the DAPS engine circuit 117 can perform data access performance shaping on the plurality of access control groups, and more particularly, shape the respective IO performance of the plurality of access control groups. Examples of the respective IO performance of the plurality of access control groups may include, but are not limited to: $N_{ACG}$ performance quotas PQ(1), PQ(2), ... and PQ($N_{ACG}$) respectively corresponding to $N_{ACG}$ access control groups #1, #2, ... and #$N_{ACG}$. For better comprehension, the $N_{ACG}$ performance quotas PQ(1), PQ(2), ... and PQ($N_{ACG}$) can be expressed with any of a predetermined logical block address (LBA) transfer rate, a predetermined IO transfer rate, etc. In addition, the plurality of access control groups may comprise the $N_{ACG}$ access control groups #1, #2, ... and #$N_{ACG}$, such as $N_{ACG}$ NV memory element sets (i.e., $N_{ACG}$ sets of NV memory elements) within the NV memory 120, where any access control group among the plurality of access control groups may comprise a corresponding NV memory element set (i.e., a corresponding set of NV memory elements) among the $N_{ACG}$ NV memory element sets, and the corresponding NV memory element set may comprise one or more NV memory elements among the plurality of NV memory elements 122-1, 122-2, ..., and 122-$N_E$, but the present invention is not limited thereto. According to some embodiments, the plurality of access control groups may vary. For example, the plurality of access control groups such as the $N_{ACG}$ access control groups #1, #2, ... and #$N_{ACG}$ may represent $N_{ACG}$ namespaces #1, #2, ... and #$N_{ACG}$ of the memory device 100 (e.g., the SSD), respectively. For another example, the plurality of access control groups such as the $N_{ACG}$ access control groups #1, #2, ... and #$N_{ACG}$ may represent $N_{ACG}$ NVMe controllers #1, #2, ... and #$N_{ACG}$ within the transmission interface circuit 118, respectively.

According to some embodiments, the plurality of dual-state LBs such as the $N_{ACG}$ dual-state LBs #1, #2, ... and #$N_{ACG}$ can be implemented as a plurality of dual-state LB circuits such as $N_{ACG}$ dual-state LB circuits DLB(1), DLB(2), ... and DLB($N_{ACG}$), and the plurality of dual-state LB circuits can be taken as examples of the multiple sub-circuits of the dedicated hardware component mentioned above. In addition, among the plurality of dual-state LB circuits, any dual-state LB circuit such as the $x^{th}$ dual-state LB circuit DLB(x) may comprise a register circuit REG(x), an overflow check circuit OCC(x), an LB tick counter TCNT(x) and an LB tick generator TGEN(x), where "x" may represent a positive integer in the interval [1, $N_{ACG}$]. The register circuit REG(x) can be arranged to store the associated parameters of the dual-state LB #x (e.g., the dual-state LB circuit DLB(x)), such as a set of parameters {LBVOL(x), LBST(x), LBRTH(x), LBRTL(x)}, the overflow check circuit OCC(x) can be arranged to perform overflow check of the dual-state LB #x, the LB tick counter TCNT(x) can be arranged to perform LB tick counting according to a series of LB ticks of the dual-state LB #x, and the LB tick generator TGEN(x) can be arranged to generate the series of LB ticks. For better comprehension, the set of parameters {LBVOL(x), LBST(x), LBRTH(x), LBRTL(x)} in the register circuit REG(x) can be referred to as the LB volume LBVOL(x), the LB state threshold LBST(x), the LB drain rate LBRTH(x) corresponding to a high priority state, and the LB drain rate LBRTL(x) corresponding to a low priority state, respectively.

Figure 3:
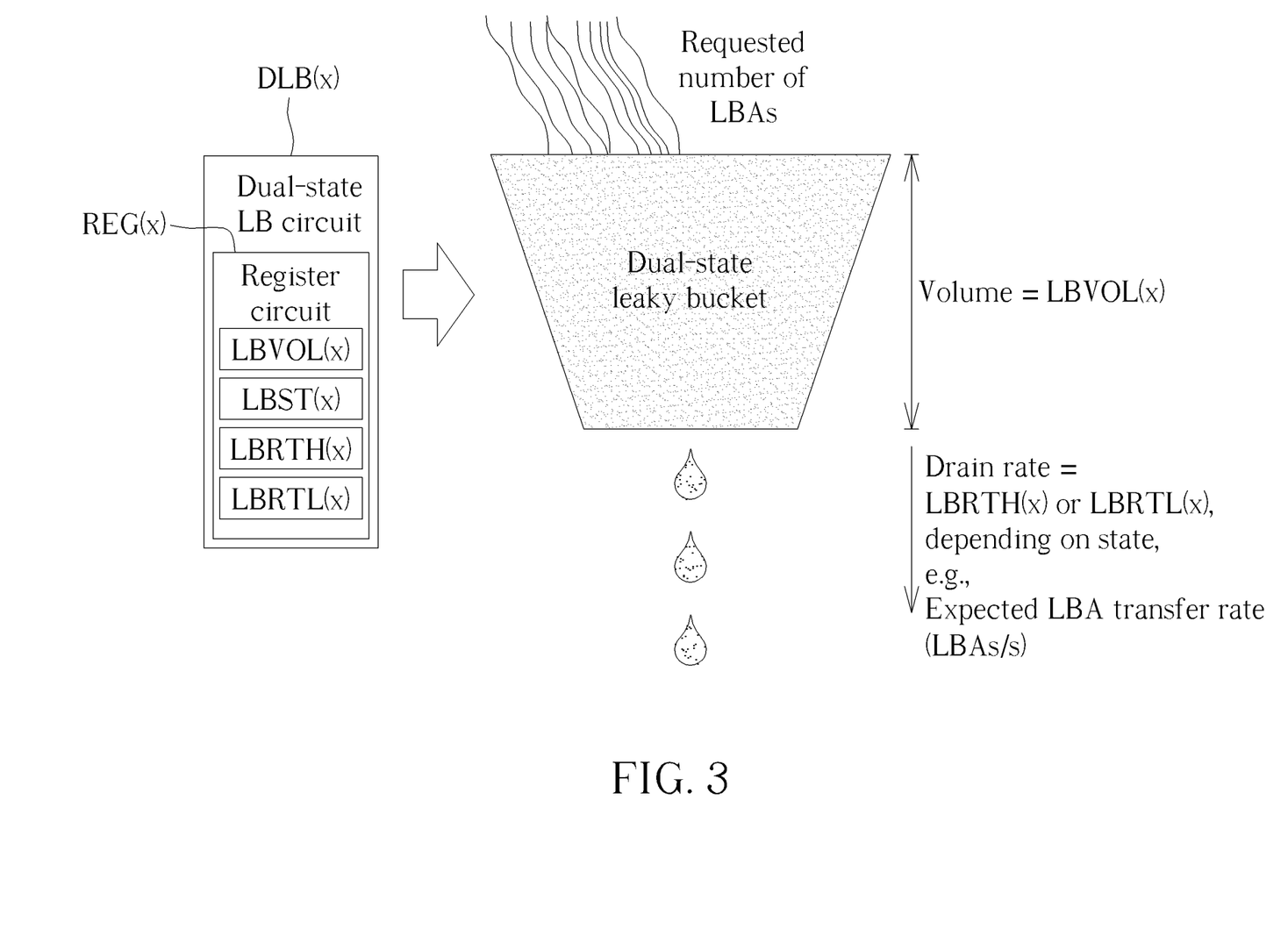
FIG. 3 illustrates some parameters involved with the programmable performance shaping control scheme shown in FIG. 2 according to an embodiment of the present invention.

FIG. 3 illustrates some parameters involved with the programmable performance shaping control scheme shown in FIG. 2 according to an embodiment of the present invention, where the dual-state LB #x can be implemented as the dual-state LB circuit DLB(x). The volume of the dual-state LB #x (e.g., the dual-state LB circuit DLB(x)) is equal to the LB volume LBVOL(x) (labeled "Volume=LBVOL(x)" for brevity). The DAPS engine circuit 117 can set the drain rate of the dual-state LB #x (e.g., the dual-state LB circuit DLB(x)) to be one of the LB drain rates LBRTH(x) and LBRTL(x) (labeled "Drain rate=LBRTH(x) or LBRTL(x)" for brevity), depending on the current state of the dual-state LB #x. For example, the requested size mentioned above can be the LBA number such as the requested number of LBAs, and the drain rate such as one of the LB drain rates LBRTH(x) and LBRTL(x) can be the predetermined LBA transfer rate such as an expected LBA transfer rate, which can be measured in unit of LBAs per second (LBAs/s). For brevity, similar descriptions for this embodiment are not repeated in detail here.

Figure 4:
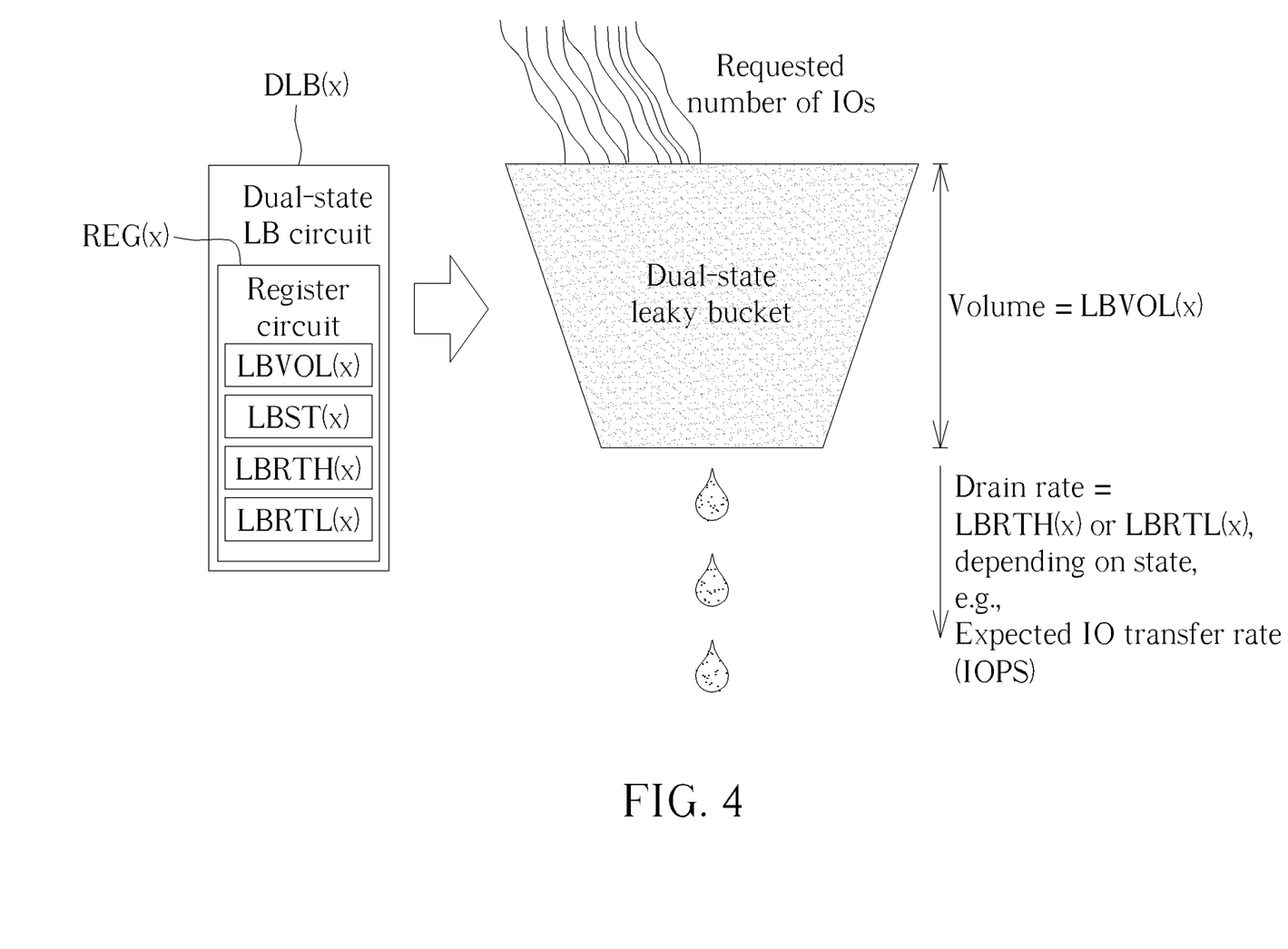
FIG. 4 illustrates some parameters involved with the programmable performance shaping control scheme shown in FIG. 2 according to another embodiment of the present invention.

FIG. 4 illustrates some parameters involved with the programmable performance shaping control scheme shown in FIG. 2 according to another embodiment of the present invention, where the dual-state LB #x can be implemented as the dual-state LB circuit DLB(x). The volume of the dual-state LB #x (e.g., the dual-state LB circuit DLB(x)) is equal to the LB volume LBVOL(x) (labeled "Volume=LBVOL(x)" for brevity). The DAPS engine circuit 117 can set the drain rate of the dual-state LB #x (e.g., the dual-state LB circuit DLB(x)) to be one of the LB drain rates LBRTH(x) and LBRTL(x) (labeled "Drain rate=LBRTH(x) or LBRTL(x)" for brevity), depending on the current state of the dual-state LB #x. For example, the requested size mentioned above can be the IO number such as the requested number of IOs, and the drain rate such as one of the LB drain rates LBRTH(x) and LBRTL(x) can be the predetermined IO transfer rate such as an expected IO transfer rate, which can be measured in unit of input/output operations per second (IOPS). For brevity, similar descriptions for this embodiment are not repeated in detail here.

Figure 5:
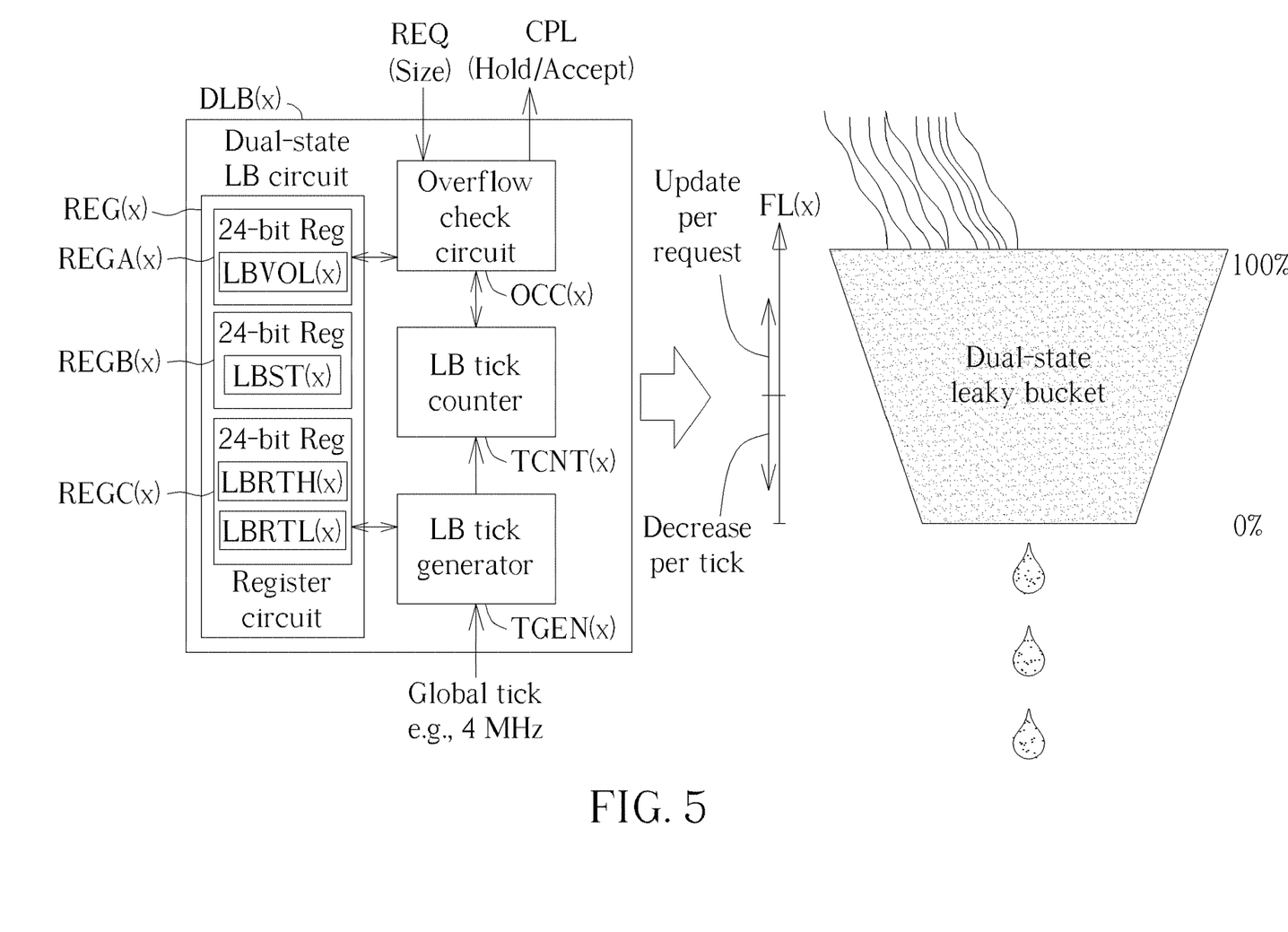
FIG. 5 illustrates a dual-state leaky bucket (LB) circuit involved with the programmable performance shaping control scheme shown in FIG. 2 according to an embodiment of the present invention.

FIG. 5 illustrates a dual-state leaky bucket (LB) circuit involved with the programmable performance shaping control scheme shown in FIG. 2 according to an embodiment of the present invention. For example, the register circuit REG(x) may comprise a plurality of registers such as 24-bit registers REGA(x), REGB(x) and REGC(x) (labeled "24-bit Reg" for brevity), but the present invention is not limited thereto. According to some embodiments, the respective bit counts of the plurality of registers may vary. In addition, the memory controller 110 can set the parameters in the plurality of registers of the register circuit REG(x), such as the LB volume LBVOL(x) in the 24-bit register REGA(x), the LB state threshold LBST(x) in the 24-bit register REGB(x), and the LB drain rates LBRTH(x) and LBRTL(x) in two 24-bit registers REGC(x), to allow the DAPS engine circuit 117 to operate according to the LB volume LBVOL(x), the LB state threshold LBST(x), and the LB drain rates LBRTH(x) and LBRTL(x).

The LB tick counter TCNT(x) can perform count down operations to decrease a counter value thereof with a decrement of one for every LB tick (e.g., every cycle of the series of LB ticks). As the LB tick counter TCNT(x) can indicate the fill level of the dual-state LB #x, the counter value of the LB tick counter TCNT(x) can be referred to as the fill level FL(x), where the case that FL(x)=LBVOL(x) may correspond to a full level (e.g., the maximum fill level corresponding to 100% of the LB volume LBVOL(x)) of the dual-state LB #x, and the case that FL(x)=0 may correspond to an empty level (e.g., the minimum fill level corresponding to o0% of the LB volume LBVOL(x)) of the dual-state LB #x. As a result, the dual-state LB circuit DLB(x) can decrease the fill level FL(x) when one of the series of LB ticks is generated (labeled "Decrease per tick" for brevity). As the fill level FL(x) cannot be a negative value, the LB tick counter TCNT(x) shall stop decrement whenever the fill level FL(x) reaches zero.

In addition, the memory controller 110 (e.g., the microprocessor 112 or the DAPS engine circuit 117) can monitor the plurality of host commands to determine that a host command among the plurality of host commands represents a host-side request carrying a requested size (e.g., a LBA number such as a requested number of LBAs, or an IO number such as a requested number of IOs), and convert the host-side request carrying the requested size into a request message such as a performance shaping request REQ. For example, for the case that this conversion is performed by the microprocessor 112, the microprocessor 112 can send the performance shaping request REQ to the DAPS engine circuit 117 to notify the DAPS engine circuit 117 of the requested size, and the DAPS engine circuit 117 can utilize a set queue pool (not shown in FIG. 5) to queue the performance shaping request REQ, for being sent to the dual-state LB circuit DLB(x), where a field PSRSIZE in the performance shaping request REQ may carry the requested size (labeled "REQ (Size)" for brevity), but the present invention is not limited thereto. For another example, for the case that this conversion is performed by a core circuit (not shown in FIG. 5) within the DAPS engine circuit 117, the DAPS engine circuit 117 can utilize the set queue pool to queue the performance shaping request REQ, for being sent to the dual-state LB circuit DLB(x). For any case among these two cases, if the current counter value plus the requested size is greater than the LB volume LBVOL(x), the dual-state LB circuit DLB(x) (e.g., the overflow check circuit OCC(x)) can set the signal CPL to be in the hold state (labeled "Hold" for brevity) to reject the performance shaping request REQ, so the performance shaping request REQ shall be on hold in the set queue pool to prevent overflow of the dual-state LB #x; otherwise, the dual-state LB circuit DLB(x) (e.g., the overflow check circuit OCC(x)) can update the counter value of the LB tick counter TCNT(x), and more particularly, add the requested size to the current counter value of the LB tick counter TCNT(x) to update the fill level FL(x) (labeled "Update per request" for brevity), and set the signal CPL to be in the accept state (labeled "Accept" for brevity) to indicate that the performance shaping request REQ is accepted.

Please note that the LB tick generator TGEN(x) can be implemented as an LB tick generation counter (e.g., a 24-bit counter), and can perform count down operations to decrease a counter value thereof with a decrement of one for every global tick (e.g., every cycle of the global ticks obtained from a global clock such as a 4 MHz clock). When the counter value of the LB tick generation counter reaches zero, one of the series of LB ticks will be generated and the LB tick generation counter shall load its initial value from the register circuit REG(x). For example, the dual-state LB #x such as the dual-state LB circuit DLB(x) may have two states such as the high priority state or the low priority state, and may be configured to selectively operate in one of different drain rates respectively corresponding to the two states. When the counter value of the LB tick generation counter reaches zero, one of the series of LB ticks will be generated and the LB tick generation counter shall set this initial value to be a certain LB drain rate among the LB drain rates LBRTH(x) and LBRTL(x), depending on whether the current state of the dual-state LB #x is the high priority state or the low priority state. For brevity, similar descriptions for this embodiment are not repeated in detail here.

Figure 6:
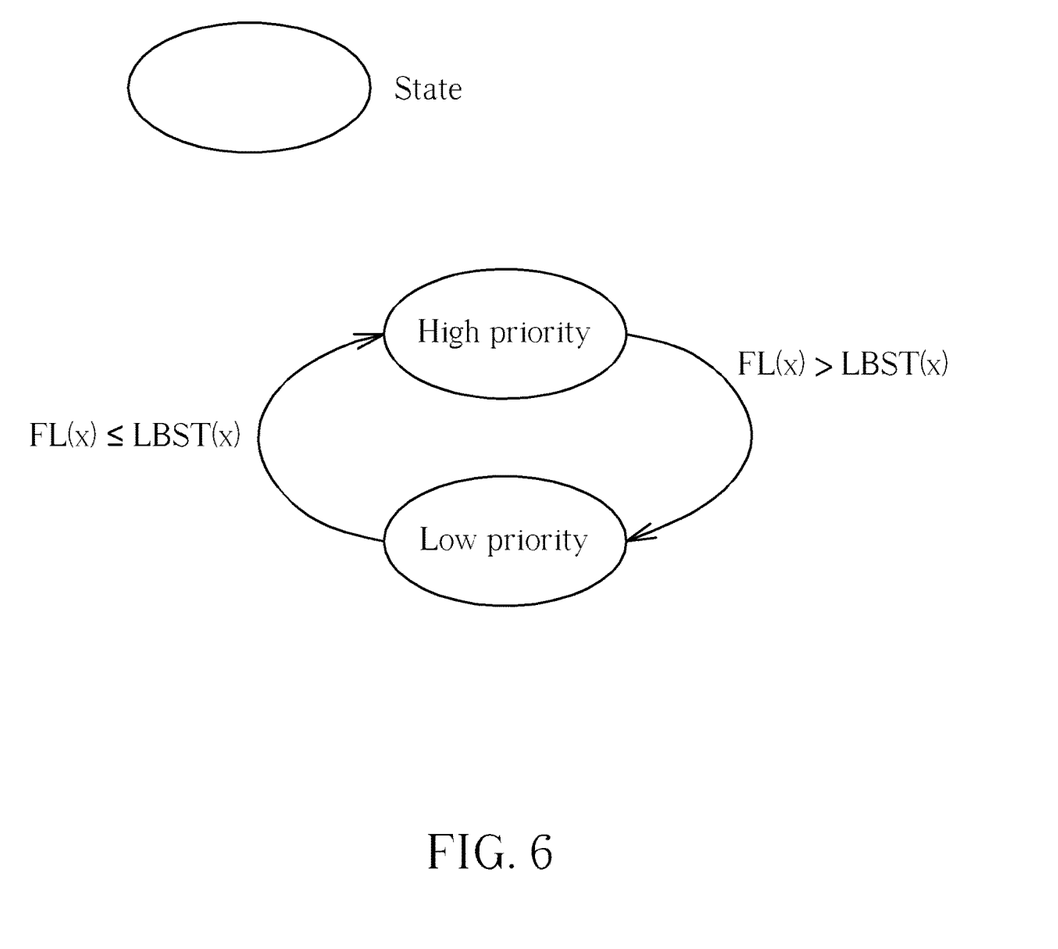
FIG. 6 is a state diagram involved with the programmable performance shaping control scheme shown in FIG. 2 according to an embodiment of the present invention.

FIG. 6 is a state diagram involved with the programmable performance shaping control scheme shown in FIG. 2 according to an embodiment of the present invention. For example, if FL(x)≤LBST(x), the dual-state LB #x (e.g., the dual-state LB circuit DLB(x)) can switch from the low priority state to the high priority state; otherwise (i.e., FL(x)>LBST(x)), the dual-state LB #x (e.g., the dual-state LB circuit DLB(x)) can switch from the high priority state to the low priority state. For brevity, similar descriptions for this embodiment are not repeated in detail here.

According to some embodiments, one or more conditions among the conditions "FL(x)≤LBST(x)" and "FL(x)>LBST(x)" shown in FIG. 6 may vary. For example, if FL(x)<LBST(x), the dual-state LB #x (e.g., the dual-state LB circuit DLB(x)) can switch from the low priority state to the high priority state; and if FL(x)≥LBST(x), the dual-state LB #x (e.g., the dual-state LB circuit DLB(x)) can switch from the high priority state to the low priority state. For another example, if FL(x)<LBST(x), the dual-state LB #x (e.g., the dual-state LB circuit DLB(x)) can switch from the low priority state to the high priority state; otherwise (i.e., if FL(x)≥LBST(x)), the dual-state LB #x (e.g., the dual-state LB circuit DLB(x)) can switch from the high priority state to the low priority state. For brevity, similar descriptions for these embodiments are not repeated in detail here.

Figure 7:
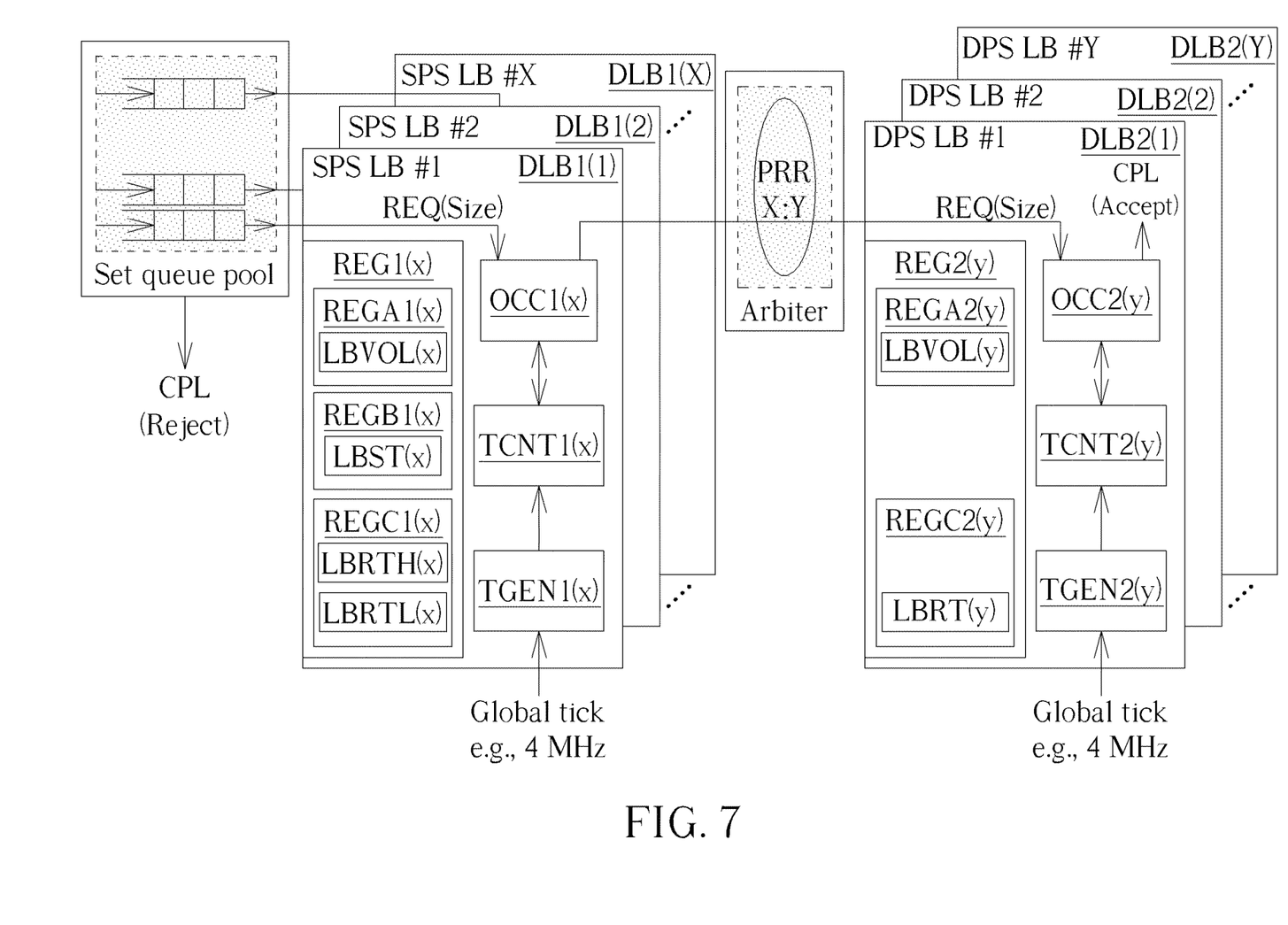
FIG. 7 is a diagram of a data access performance shaping (DAPS) engine circuit in the architecture shown in FIG. 1 according to an embodiment of the present invention, where the DAPS engine circuit can operate according to the method.

FIG. 7 is a diagram of the DAPS engine circuit 117 in the architecture shown in FIG. 1 according to an embodiment of the present invention, where the DAPS engine circuit 117 can operate according to the method. The dual-state LB model 117M of the DAPS engine circuit 117 may comprise two levels of dual-state LBs:

(1) a plurality of level-one (L1) dual-state LBs, such as X system-side performance shaping (SPS) LBs #1, #2, . . . and #X, wherein the X SPS LBs #1, #2, . . . and #X can be implemented as X level-one (L1) dual-state LB circuits DLB1(1), DLB1(2), . . . and DLB1(X), respectively, and the architecture of any level-one dual-state LB circuits DLB1($x$) among the X level-one dual-state LB circuits DLB1(1), DLB1(2), . . . and DLB1(X) can be the same as or similar to the architecture of the dual-state LB circuit DLB(x) shown in FIG. 5, with the associated symbols having a tailing code "1" to correspond to the level-one; and (2) a plurality of level-two (L2) dual-state LBs, such as Y device-side performance shaping (DPS) LBs #1, #2, . . . and #Y, wherein the Y DPS LBs #1, #2, . . . and #Y can be implemented as Y level-two (L2) dual-state LB circuits DLB2(1), DLB2(2), . . . and DLB2(Y), respectively, and the architecture of any level-two dual-state LB circuits DLB2($y$) among the Y level-two dual-state LB circuits DLB2(1), DLB2(2), . . . and DLB2(Y) can be the same as or similar to the architecture of the dual-state LB circuit DLB(x) shown in FIG. 5, with the associated symbols having a tailing code "2" to correspond to the level-two;

wherein, for example, X=512 and Y=4, but the present invention is not limited thereto. In some examples, the respective values of the respective LB counts (or LB circuit counts) X and Y may vary. In addition to the X level-one dual-state LB circuits DLB1(1), DLB1(2), . . . and DLB1(X) and the Y level-two dual-state LB circuits DLB2(1), DLB2(2), . . . and DLB2(Y), the DAPS engine circuit 117 may further comprise:

(1) the pool set queue pool mentioned above, wherein the DAPS engine circuit 117 can utilize the pool set queue pool to X sets of performance shaping requests {REQ} for the plurality of access control groups such as X access control groups #1, #2, . . . and #X (e.g., let $N_{ACG}$=X), respectively, for being sent to the X level-one dual-state LB circuits DLB1(1), DLB1(2), . . . and DLB1(X), respectively; and (2) at least one arbiter (e.g., one or more arbiters), coupled between the X level-one dual-state LB circuits DLB1(1), DLB1(2), . . . and DLB1(X) and the Ylevel-two dual-state LB circuits DLB2(1), DLB2(2), . . . and DLB2(Y), wherein the DAPS engine circuit 117 can utilize the at least one arbiter to deliver (e.g., forward) all performance shaping requests {REQ} among the X sets of performance shaping requests {REQ} to corresponding destinations among the Y level-two dual-state LB circuits DLB2(1), DLB2(2), . . . and DLB2(Y), for example, in turn (labeled "PRR X:Y" for brevity);

where when the signal CPL of any of the X level-one dual-state LB circuits DLB1(1), DLB1(2), and DLB1(X) is set to have the hold state to reject a certain performance shaping request REQ among the corresponding set of performance shaping requests {REQ}, this signal CPL having the hold state can be forwarded to the upper layer (e.g., the microprocessor 112 in the first case, or the core circuit of the DAPS engine circuit 117 in the second case) to notify the upper layer of this situation (labeled "Reject" for brevity). Additionally, the X level-one dual-state LB circuits DLB1(1), DLB1(2), . . . and DLB1(X) can control the performance metrics of the X access control groups #1, #2, . . . and #X according to the X sets of performance shaping requests {REQ}, respectively, and the Y level-two dual-state LB circuits DLB2(1), DLB2(2), . . . and DLB2(Y) can control the device level performance metrics (e.g., the performance metrics of the NV memory elements 122-1, 122-2, . . . , and 122-$N_E$ within the NV memory 120, in a situation where $N_E$=Y) according to the performance shaping requests {REQ} delivered (e.g., forwarded) by the at least one arbiter, respectively. For brevity, similar descriptions for this embodiment are not repeated in detail here.

According to some embodiments, in a situation where Y=4, the Y L2 dual-state LB circuits DLB2(1), DLB2(2), . . . and DLB2(Y) such as four L2 dual-state LB circuits DLB2(1), DLB2(2), DLB2(3) and DLB2(4) can be arranged to perform performance shaping regarding read IOPS, read throughput, write IOPS and write throughput, respectively. For brevity, similar descriptions for these embodiments are not repeated in detail here.

According to some embodiments, any L2 dual-state LB circuits DLB2(y) among the four L2 dual-state LB circuits DLB2(1), DLB2(2), DLB2(3) and DLB2(4) can be arranged to perform the performance shaping thereof according to at least one LB drain rate (e.g., one or more LB drain rates) such as the LB drain rate LBRT(y). For brevity, similar descriptions for these embodiments are not repeated in detail here.

Figure 8:
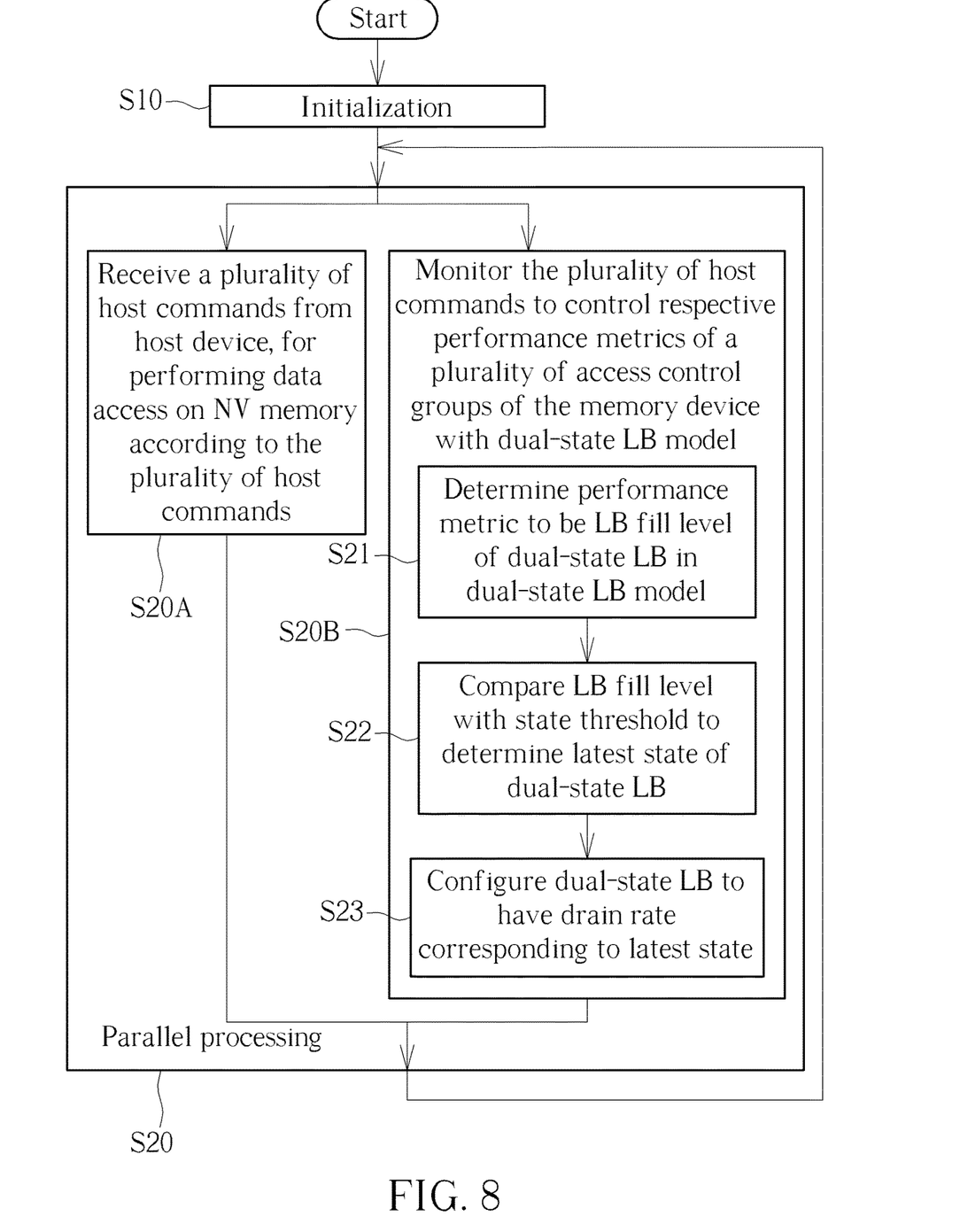
FIG. 8 is a flowchart of the method according to an embodiment of the present invention.

FIG. 8 is a flowchart of the method according to an embodiment of the present invention, where the method can be applied to the memory device 100 shown in FIG. 1, and more particularly, the memory controller 110 and the components thereof.

In Step S10, the memory device 100 (e.g., the memory controller 110) can perform initialization, for example, during a boot up of the memory device 100.

In Step S20, the memory device 100 (e.g., the memory controller 110) can perform parallel processing, and more particularly, perform the operations of Steps S20A and S20B in a parallel manner.

In Step S20A, the memory device 100 (e.g., the memory controller 110) can receive the plurality of host commands from the host device 50 through the transmission interface circuit 118 of the memory controller 110, for performing data access on the NV memory 120 according to the plurality of host commands.

In Step S20B, the memory device 100 (e.g., the memory controller 110) can monitor the plurality of host commands to control respective performance metrics of the plurality of access control groups (e.g., the $N_{ACG}$ access control groups #1, #2, . . . and #$N_{ACG}$) of the memory device 100 with the dual-state LB model 117M. For example, regarding any access control group among the plurality of access control groups, such as the $x^{th}$ access control groups #x among the $N_{ACG}$ access control groups #1, #2, . . . and #$N_{ACG}$, controlling the respective performance metrics of the plurality of access control groups with the dual-state LB model 117M may comprise the operations of Steps S21, S22 and S23.

In Step S21, the memory device 100 (e.g., the memory controller 110) can utilize the data access performance shaping engine circuit 117 to determine at least one performance metric of the $x^{th}$ access control groups #x according to at least one command among the plurality of host commands to be an LB fill level (e.g., the fill level FL(x)) of the dual-state LB #x in the dual-state LB model 117M.

In Step S22, the memory device 100 (e.g., the memory controller 110) can utilize the data access performance shaping engine circuit 117 to compare the LB fill level (e.g., the fill level FL(x)) with a state threshold (e.g., the LB state threshold LBST(x)) to determine the latest state of a dual-state LB (e.g., the dual-state LB #x such as the dual-state LB circuit DLB(x)).

In Step S23, the memory device 100 (e.g., the memory controller 110) can utilize the data access performance shaping engine circuit 117 to configure the dual-state LB (e.g., the dual-state LB #x such as the dual-state LB circuit DLB(x)) to have a drain rate corresponding to the latest state (e.g., a certain LB drain rate among the LB drain rates LBRTH(x) and LBRTL(x), depending on whether the current state of the dual-state LB #x is the high priority state or the low priority state).

As shown in FIG. 8, the memory device 100 (e.g., the memory controller 110) can perform the parallel processing with respect to the subsequent host commands from the host device 50, to perform data access performance shaping in an online manner. For brevity, similar descriptions for this embodiment are not repeated in detail here.

For better comprehension, the method may be illustrated with the working flow shown in FIG. 8, but the present invention is not limited thereto. According to some embodiments, one or more steps may be added, deleted, or changed in the working flow shown in FIG. 8. For example, regarding the any access control group among the plurality of access control groups, such as the $x^{th}$ access control groups #x among the $N_{ACG}$ access control groups #1, #2, . . . and #$N_{ACG}$, controlling the respective performance metrics of the plurality of access control groups with the dual-state LB model 117M may comprise:

(1) utilizing the data access performance shaping engine circuit 117 to determine at least one first performance metric of the any access control group (e.g., the $x^{th}$ access control groups #x) according to at least one first command among the plurality of host commands to be a first LB fill level (e.g., the fill level FL(x)) of the dual-state LB #x in the dual-state LB model 117M, wherein the at least one first command may carry first information related to data access performance of the any access control group (e.g., the $x^{th}$ access control groups #x);

(2) in response to the first LB fill level (e.g., the fill level FL(x)) being below the state threshold (e.g., the LB state threshold LBST(x)), utilizing the data access performance shaping engine circuit 117 to determine the dual-state LB (e.g., the dual-state LB #x such as the dual-state LB circuit DLB(x)) to be in a first predetermined state among multiple predetermined states of the dual-state LB, such as a certain state among the high priority state and the low priority state; and (3) in response to the dual-state LB being in the first predetermined state, utilizing the data access performance shaping engine circuit 117 to configure the dual-state LB (e.g., the dual-state LB #x such as the dual-state LB circuit DLB(x)) to have a first predetermined drain rate corresponding to the first predetermined state (e.g., a certain LB drain rate among the LB drain rates LBRTH(x) and LBRTL(x), depending on whether the current state of the dual-state LB #x is the high priority state or the low priority state), for dynamically adjusting a performance quota of the any access control group (e.g., the performance quota PQ(x) of the $x^{th}$ access control groups #x), wherein the first predetermined drain rate is selected from multiple predetermined drain rate respectively corresponding to the multiple predetermined states (e.g., the high priority state and the low priority state) of the dual-state LB;

but the present invention is not limited thereto. For another example, regarding the any access control group among the plurality of access control groups, such as the $x^{th}$ access control groups #x among the $N_{ACG}$ access control groups #1, #2, . . . and #$N_{ACG}$, controlling the respective performance metrics of the plurality of access control groups with the dual-state LB model 117M may further comprise:

(1) utilizing the data access performance shaping engine circuit 117 to determine at least one second performance metric of the any access control group (e.g., the $x^{th}$ access control groups #x) according to at least one second command among the plurality of host commands to be a second LB fill level (e.g., the fill level FL(x)) of the dual-state LB #x in the dual-state LB model 117M, wherein the at least one second command may carry second information related to the data access performance of the any access control group (e.g., the $x^{th}$ access control groups #x);

(2) in response to the second LB fill level (e.g., the fill level FL(x)) being above the state threshold (e.g., the LB state threshold LBST(x)), utilizing the data access performance shaping engine circuit 117 to determine the dual-state LB (e.g., the dual-state LB #x such as the dual-state LB circuit DLB(x)) to be in a second predetermined state among the multiple predetermined states of the dual-state LB, such as the other state among the high priority state and the low priority state; and (3) in response to the dual-state LB being in the second predetermined state, utilizing the data access performance shaping engine circuit 117 to configure the dual-state LB (e.g., the dual-state LB #x such as the dual-state LB circuit DLB(x)) to have a second predetermined drain rate corresponding to the second predetermined state (e.g., the other LB drain rate among the LB drain rates LBRTH(x) and LBRTL(x), depending on whether the current state of the dual-state LB #x is the high priority state or the low priority state), for dynamically adjusting the performance quota of the any access control group (e.g., the performance quota PQ(x) of the $x^{th}$ access control groups #x), wherein the second predetermined drain rate is selected from the multiple predetermined drain rate respectively corresponding to the multiple predetermined states (e.g., the high priority state and the low priority state) of the dual-state LB;

wherein, for example, the first predetermined state may represent the high priority state regarding the data access, and the second predetermined state may represent the low priority state regarding the data access, but the present invention is not limited thereto. For brevity, similar descriptions for these embodiments are not repeated in detail here.

According to some embodiments, the at least one first performance metric may comprise one or a combination of at least one first IOPS of the any access control group and at least one first throughput of the any access control group. In addition, the at least one second performance metric may comprise one or a combination of at least one second IOPS of the any access control group and at least one second throughput of the any access control group. For brevity, similar descriptions for these embodiments are not repeated in detail here.

According to some embodiments, the first information may indicate a data access amount that is requested by the at least one first command regarding the any access control group. In addition, the second information may indicate a data access amount that is requested by the at least one second command regarding the any access control group. For brevity, similar descriptions for these embodiments are not repeated in detail here.

Figure 9:
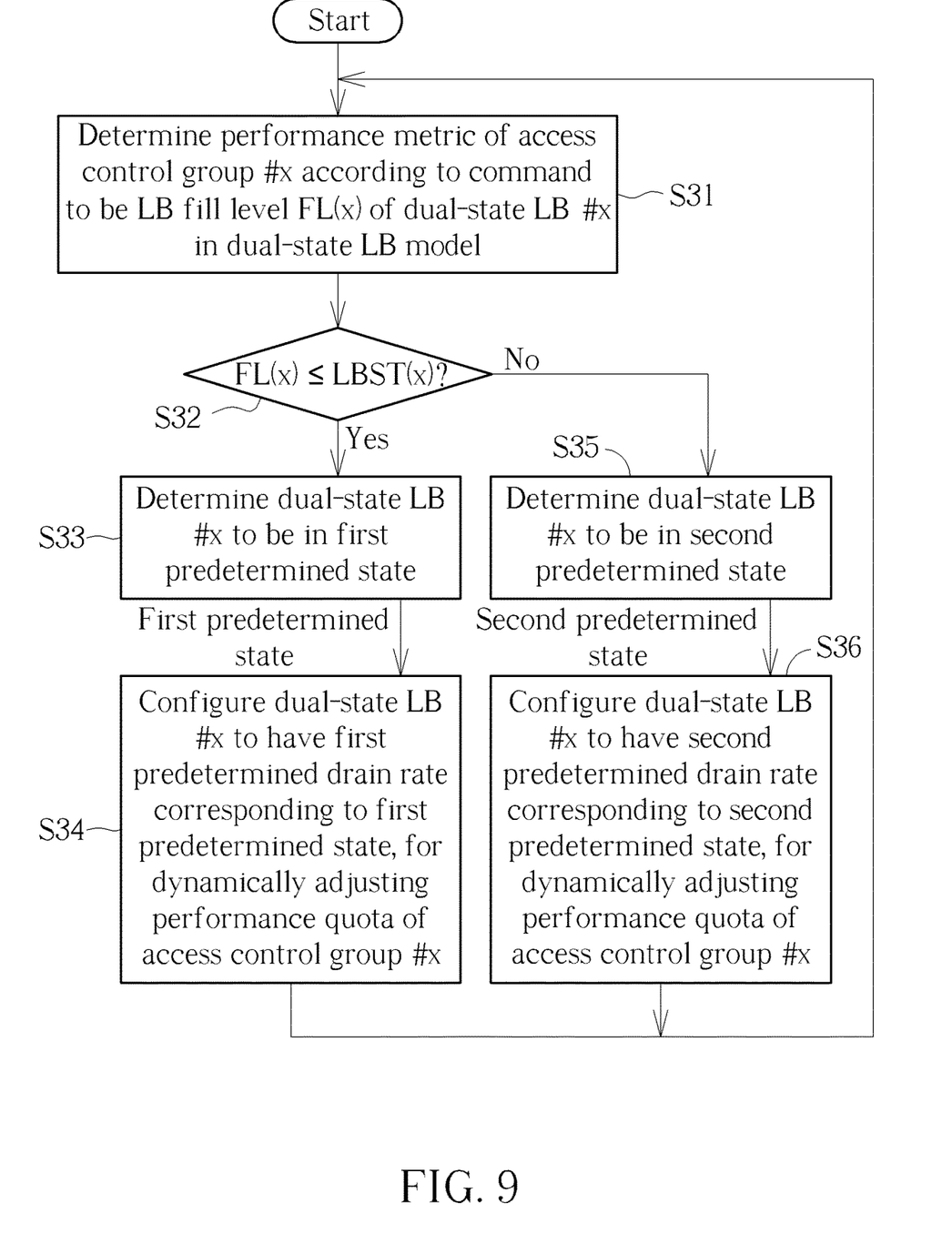
FIG. 9 illustrates a working flow of the method according to an embodiment of the present invention, where some operations of the working flow shown in FIG. 9 can be taken as examples of that in a partial working flow shown in FIG. 8.

FIG. 9 illustrates a working flow of the method according to an embodiment of the present invention, where some operations of the working flow shown in FIG. 9 can be taken as examples of that in a partial working flow shown in FIG. 8.

In Step S31, the memory device 100 (e.g., the memory controller 110) can utilize the data access performance shaping engine circuit 117 to determine at least one performance metric of the $x^{th}$ access control groups #x according to at least one command among the plurality of host commands to be the LB fill level (e.g., the fill level FL(x)) of the dual-state LB #x in the dual-state LB model 117M.

In Step S32, the memory device 100 (e.g., the memory controller 110) can utilize the data access performance shaping engine circuit 117 to determine whether the LB fill level such as the fill level FL(x) is less than or equal to the state threshold such as the LB state threshold LBST(x) (labeled "FL(x)≤LBST(x)" for brevity). If Yes, Step S33 is entered; if No, Step S35 is entered.

In Step S33, the memory device 100 (e.g., the memory controller 110) can utilize the data access performance shaping engine circuit 117 to determine the dual-state LB #x (e.g., the dual-state LB circuit DLB(x)) to be in the first predetermined state.

In Step S34, in response to the dual-state LB #x (e.g., the dual-state LB circuit DLB(x)) being in the first predetermined state, the memory device 100 (e.g., the memory controller 110) can utilize the data access performance shaping engine circuit 117 to configure the dual-state LB #x (e.g., the dual-state LB circuit DLB(x)) to have the first predetermined drain rate corresponding to the first predetermined state, for dynamically adjusting the performance quota PQ(x) of the $x^{th}$ access control group #x.

In Step S35, the memory device 100 (e.g., the memory controller 110) can utilize the data access performance shaping engine circuit 117 to determine the dual-state LB #x (e.g., the dual-state LB circuit DLB(x)) to be in the second predetermined state.

In Step S36, in response to the dual-state LB #x (e.g., the dual-state LB circuit DLB(x)) being in the second predetermined state, the memory device 100 (e.g., the memory controller 110) can utilize the data access performance shaping engine circuit 117 to configure the dual-state LB #x (e.g., the dual-state LB circuit DLB(x)) to have the second predetermined drain rate corresponding to the second predetermined state, for dynamically adjusting the performance quota PQ(x) of the $x^{th}$ access control group #x.

As shown in FIG. 9, the memory device 100 (e.g., the memory controller 110) can perform the operations of at least one partial working flow with respect to the subsequent host commands from the host device 50, to perform data access performance shaping in an online manner. For brevity, similar descriptions for this embodiment are not repeated in detail here.

For better comprehension, the method may be illustrated with the working flow shown in FIG. 9, but the present invention is not limited thereto. According to some embodiments, one or more steps may be added, deleted, or changed in the working flow shown in FIG. 9.

According to some embodiments, the dual-state LB model 117M may comprise a plurality of dual-state LBs respectively corresponding to the plurality of access control groups. In this situation, the dual-state LB is one of the plurality of dual-state LBs that corresponds to the any access control group. For brevity, similar descriptions for these embodiments are not repeated in detail here.

According to some embodiments, the performance quota of the any access control group may represent the performance quota PQ(x) allocated for the any access control group among the plurality of access control groups. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing data access performance shaping of a memory device, the method being applied to a memory controller of the memory device, the memory device comprising the memory controller and a non-volatile (NV) memory, the NV memory comprising at least one NV memory element, the method comprising:
receiving a plurality of host commands from a host device, for performing data access on the NV memory according to the plurality of host commands; and
monitoring the plurality of host commands to control respective performance metrics of a plurality of access control groups of the memory device with a dual-state leaky bucket (LB) model, wherein regarding any access control group among the plurality of access control groups, controlling the respective performance metrics of the plurality of access control groups with the dual-state LB model comprises:
determining at least one first performance metric of the any access control group according to at least one first command among the plurality of host commands to be a first LB fill level of a dual-state LB in the dual-state LB model, wherein the at least one first command carries first information related to data access performance of the any access control group;
in response to the first LB fill level being below a state threshold, determining the dual-state LB to be in a first predetermined state among multiple predetermined states of the dual-state LB; and
in response to the dual-state LB being in the first predetermined state, configuring the dual-state LB to have a first predetermined drain rate corresponding to the first predetermined state, for dynamically adjusting a performance quota of the any access control group, wherein the first predetermined drain rate is selected from multiple predetermined drain rate respectively corresponding to the multiple predetermined states of the dual-state LB.

2. The method of claim 1, wherein regarding the any access control group among the plurality of access control groups, controlling the respective performance metrics of the plurality of access control groups with the dual-state LB model further comprises:
determining at least one second performance metric of the any access control group according to at least one second command among the plurality of host commands to be a second LB fill level of the dual-state LB in the dual-state LB model, wherein the at least one second command carries second information related to the data access performance of the any access control group;
in response to the second LB fill level being above the state threshold, determining the dual-state LB to be in a second predetermined state among the multiple predetermined states of the dual-state LB; and
in response to the dual-state LB being in the second predetermined state, configuring the dual-state LB to have a second predetermined drain rate corresponding to the second predetermined state, for dynamically adjusting the performance quota of the any access control group, wherein the second predetermined drain rate is selected from the multiple predetermined drain rate respectively corresponding to the multiple predetermined states of the dual-state LB.

3. The method of claim 1, wherein the plurality of access control groups represent a plurality of quality of service (QoS) control groups of the memory device.

4. The method of claim 1, wherein the dual-state LB model comprises a plurality of dual-state LBs respectively corresponding to the plurality of access control groups, and the dual-state LB is one of the plurality of dual-state LBs that corresponds to the any access control group.

5. The method of claim 1, wherein the first information indicates a data access amount that is requested by the at least one first command regarding the any access control group.

6. The method of claim 1, wherein the at least one first performance metric comprises one or a combination of at least one first input/output operations per second (IOPS) of the any access control group and at least one first throughput of the any access control group.

7. The method of claim 1, wherein the performance quota of the any access control group represents the performance quota allocated for the any access control group among the plurality of access control groups.

8. The method of claim 1, wherein the first predetermined state represents a high priority state regarding the data access, and another predetermined state among the multiple predetermined states represents a low priority state regarding the data access.

9. A memory controller of a memory device, the memory device comprising the memory controller and a non-volatile (NV) memory, the NV memory comprising at least one NV memory element, the memory controller comprising:
- a processing circuit, arranged to control the memory controller according to a plurality of host commands from a host device, to allow the host device to access the NV memory through the memory controller, wherein the processing circuit is arranged to perform data access control of the memory device with aid of a predetermined command;
- a transmission interface circuit, arranged to perform communications with the host device; and
- a data access performance shaping engine circuit, arranged to perform data access performance shaping;

wherein:
- the memory controller receives the plurality of host commands from the host device through the transmission interface circuit of the memory controller, for performing data access on the NV memory according to the plurality of host commands; and
- the memory controller monitors the plurality of host commands to control respective performance metrics of a plurality of access control groups of the memory device with a dual-state leaky bucket (LB) model, wherein regarding any access control group among the plurality of access control groups, controlling the respective performance metrics of the plurality of access control groups with the dual-state LB model comprises:
  - utilizing the data access performance shaping engine circuit to determine at least one first performance metric of the any access control group according to at least one first command among the plurality of host commands to be a first LB fill level of a dual-state LB in the dual-state LB model, wherein the at least one first command carries first information related to data access performance of the any access control group;
  - in response to the first LB fill level being below a state threshold, utilizing the data access performance shaping engine circuit to determine the dual-state LB to be in a first predetermined state among multiple predetermined states of the dual-state LB; and
  - in response to the dual-state LB being in the first predetermined state, utilizing the data access performance shaping engine circuit to configure the dual-state LB to have a first predetermined drain rate corresponding to the first predetermined state, for dynamically adjusting a performance quota of the any access control group, wherein the first predetermined drain rate is selected from multiple predetermined drain rate respectively corresponding to the multiple predetermined states of the dual-state LB.

10. The memory controller of claim 9, wherein regarding the any access control group among the plurality of access control groups, controlling the respective performance metrics of the plurality of access control groups with the dual-state LB model further comprises:
- utilizing the data access performance shaping engine circuit to determine at least one second performance metric of the any access control group according to at least one second command among the plurality of host commands to be a second LB fill level of the dual-state LB in the dual-state LB model, wherein the at least one second command carries second information related to the data access performance of the any access control group;
- in response to the second LB fill level being above the state threshold, utilizing the data access performance shaping engine circuit to determine the dual-state LB to be in a second predetermined state among the multiple predetermined states of the dual-state LB; and
- in response to the dual-state LB being in the second predetermined state, utilizing the data access performance shaping engine circuit to configure the dual-state LB to have a second predetermined drain rate corresponding to the second predetermined state, for dynamically adjusting the performance quota of the any access control group, wherein the second predetermined drain rate is selected from the multiple predetermined drain rate respectively corresponding to the multiple predetermined states of the dual-state LB.

11. The memory device comprising the memory controller of claim 9, wherein the memory device comprises:
- the NV memory, configured to store information; and
- the memory controller, coupled to the NV memory, configured to control operations of the memory device.

12. An electronic device comprising the memory device of claim 11, and further comprising:
- the host device, coupled to the memory device, wherein the host device comprises:
  - at least one processor, arranged for controlling operations of the host device; and
  - a power supply circuit, coupled to the at least one processor, arranged for providing power to the at least one processor and the memory device;
- wherein the memory device provides the host device with storage space.

* * * * *